US007827067B2

(12) United States Patent
Chang

(10) Patent No.: US 7,827,067 B2
(45) Date of Patent: Nov. 2, 2010

(54) DEVICE AND METHOD FOR TIME AND KNOWLEDGE EXCHANGE AND MANAGEMENT

(75) Inventor: Shi-Kuo Chang, 35 Shady Dr. West, Mt. Lebanon, PA (US) 15228

(73) Assignees: Industrial Technology Research Institute, Hsin Chu (TW); Shi-Kuo Chang, Mt. Lebanon, PA (US)

( * ) Notice: Subject to any disclaimer, the term of this patent is extended or adjusted under 35 U.S.C. 154(b) by 908 days.

(21) Appl. No.: 10/879,283

(22) Filed: Jun. 30, 2004

(65) Prior Publication Data

US 2007/0174066 A1 Jul. 26, 2007

(51) Int. Cl.
*G06Q 30/00* (2006.01)
*G06F 17/00* (2006.01)
(52) U.S. Cl. .............................. 705/26; 705/27; 706/45
(58) Field of Classification Search .................. 705/26, 705/27; 706/45
See application file for complete search history.

(56) References Cited

U.S. PATENT DOCUMENTS 5,862,223 A * 1/1999 Walker et al. ................. 705/50
6,826,552 B1 * 11/2004 Grosser et al. ................ 706/47
7,418,421 B2 * 8/2008 Fitzpatrick et al. ............ 705/37

OTHER PUBLICATIONS

S. Chang and C. Vaidya, "Knowledge Exchange Management: An online bidding system for Knowledge Exchange," CS2000: MS Thesis Project, University of Pittsburgh, Apr. 2004, pp. 1-58.*
Chang, "A Model for Information Exchange," International Journal of Policy Analysis and Information Systems, V.5,N.2, Mar. 1, 1981, pp. 67-93.*
Herbster et al. "Tracking the Best Expert", Machine Learning NN 1-29, 1998.*
Herbster et al. "Tracking the Best Expert", Machine Learning NN 1-29, 1998.
Olsen et al. "Collaborative Engineering Based on Knowledge Sharing Agreements" , Proceeding of the 1994 ASME Database Symposium, Sep. 11-14, 1994, Minneapolis, MN.
McGuire et al. "Shade" Technology for Knowledge-Based Collaborative Engineering Journal of Concurrent Engineering: Applications and Research (CERA), Sep. 1993.
N. Littlestone "The Weighted Majority Algorithim" Proceedings of the IEEE Symposium of Foundations of Computer Science, pp. 256-261, 1989.
H. Nakashima, "Cyber Assist Project for Situated Human Support" Proceeding of 2002 International Conference on Distributed Multimedia Systems, Hotel Sofitel, San Francisco Bay, Sep. 26-28, 2002.

(Continued)

*Primary Examiner*—Adam Levine
(74) *Attorney, Agent, or Firm*—Finnegan, Henderson, Farabow, Garrett & Dunner, LLP

(57) ABSTRACT

A knowledge management system includes a profile manager for managing user profiles and a bid manager for receiving a project listing and a set of project parameters associated with the listing. The bid manager also provides a bidding room according to at least one of the project parameters. In addition, the project parameters include an identification of at least one expertise area associated with a project.

55 Claims, 6 Drawing Sheets

OTHER PUBLICATIONS

Hasselink et al. "CyberLab, A New Paradigm in Distance Learning" National Instruments Brochure, 1999.

Chang, "A Model for Information Exchange" International Journal of Policy Analysis and Information Systems, vol. 5, No. 2, 67-93, 1981.

Chang et al., "Adlet: An Active Document Abstraction for Multimedia Information Fusion" 1-33.

S. Chang and C. Vaidya, "Knowledge Exchange Management: An Online Bidding System for Knowledge Exchange" Technical Report, 1-58, Apr. 2004.

S. Chang "The Chron Project" http://jupiter.ksi.edu/ ~changsk/chronbot/.

Chang et al. "MAWC Operations for Growing Book", Journal of Computer Processing of Oriental Languages.

S. Chang "Querying Morphing for Information Fusion", Department of Computer Science, University of Pittsburgh, 1-26. http://www.cs.pitt.edu/~chang/163/1631topic.html.

Polese et al. "Towards a Theory of Normalization for Multimedia Databases" Department of Computer Science, University of Pittsburgh, 1-20.

S. Chang "Querying Distributed Multimedia Databases and Data Sources for Senor Data Fusion" Department of Computer Science, University of Pittsburgh, 1-30.

"Deposit and Withdraw your Time Here, Chronobot the Bank of Time" artwork drawn by L. Tang under supervision of S. Chang, Apr. 2004.

* cited by examiner

DEVICE AND METHOD FOR TIME AND KNOWLEDGE EXCHANGE AND MANAGEMENT

BACKGROUND

1. Field of the Invention

The present invention relates to a device and a method for managing, exchanging, and trading time, knowledge, or both. More particularly, the present invention may relate to an interactive mechanism for, managing, exchanging, and trading time, knowledge, or both.

2. Background of the Invention

Time and knowledge are important aspects of human life, without which human beings can hardly progress, evolve, or even survive. Over time, knowledge has evolved both in breadth and depth and accumulated significantly. Such accumulation, well recognized as an "explosion of knowledge" in our time, has made managing time and/or knowledge more and more important. Recently, knowledge management has received increasing recognition in its importance, as reduction of time spent in non-productive knowledge search and knowledge duplication or regeneration remain a key to efficiency.

Prior developments on the topic are limited, mostly limited to ways of storing, processing, and organizing information in a database. Existing systems mostly deal with the static storage of knowledge. Therefore, there is a need for a system and a method that are capable of managing time, knowledge, or both.

SUMMARY OF THE INVENTION

A knowledge management system consistent with the present invention comprises a profile manager for managing user profiles and a bid manager for receiving a project listing and a set of project parameters associated with the listing. The bid manager also provides a bidding room according to at least one of the project parameters. In one embodiment, the project parameters comprise an identification of at least one expertise area associated with a project.

Another knowledge management system consistent with the present invention comprises a profile manager for managing user profiles and a bid manager for receiving a project listing and a set of project parameters associated with the listing. The bid manager provides a bidding room according to at least one of the project parameters. In one embodiment, the project parameters comprise an identification of at least one expertise area associated with a project and a weight factor associated with the expertise area. Also, the bid manager may include an access control manager for verifying a user's registration, verifying a bidder's registration, and/or controlling a potential bidder's access to the project listing according to a user profile of the potential bidder and one or more of the project parameters.

In one embodiment, a profile managing system for a knowledge exchange system consistent with the present invention comprises a profile manager for managing a user profile and providing at least portion of the user profile to the knowledge exchange system and a database for storing the user profile. The user profile comprises an identification of at least one expertise area of a user and an identification of an experience level of the user in the expertise area.

A knowledge management method consistent with the present invention comprises: receiving a project listing containing a set of project parameters; providing a bidding room according to at least one of the project parameters; receiving a bid from a bidder; and resolving a bid according to at least one of the project parameters. In one embodiment, the project parameters comprise an identification of at least one expertise area associated with a project.

A knowledge management method consistent with the present invention comprises: receiving a project listing containing a set of project parameters; providing a bidding room according to at least one of the project parameters; controlling a potential bidder's access according to at least one of the project parameters; receiving a bid from a bidder having access; and resolving a bid according to at least one of the project parameters. In one embodiment, the project parameters comprise an identification of at least one expertise area associated with a project and a weight factor associated with the expertise area.

DETAILED DESCRIPTION OF THE INVENTION

The present invention relates to a device and a method for trading, exchanging, and managing time, knowledge, or both. Embodiments consistent with the invention provide a method and a device allowing exchange of time, knowledge, or both. For example, the method or the device may enable a group of users or user delegates to exchange time and knowledge. In addition, a method or a device consistent with the invention may facilitate e-learning and distance education. One or more devices in the embodiments described below may include, or be configured or combined to provide, a knowledge manager, a time manager, a time and/or knowledge exchanger, and a virtual classroom.

Figure 1:
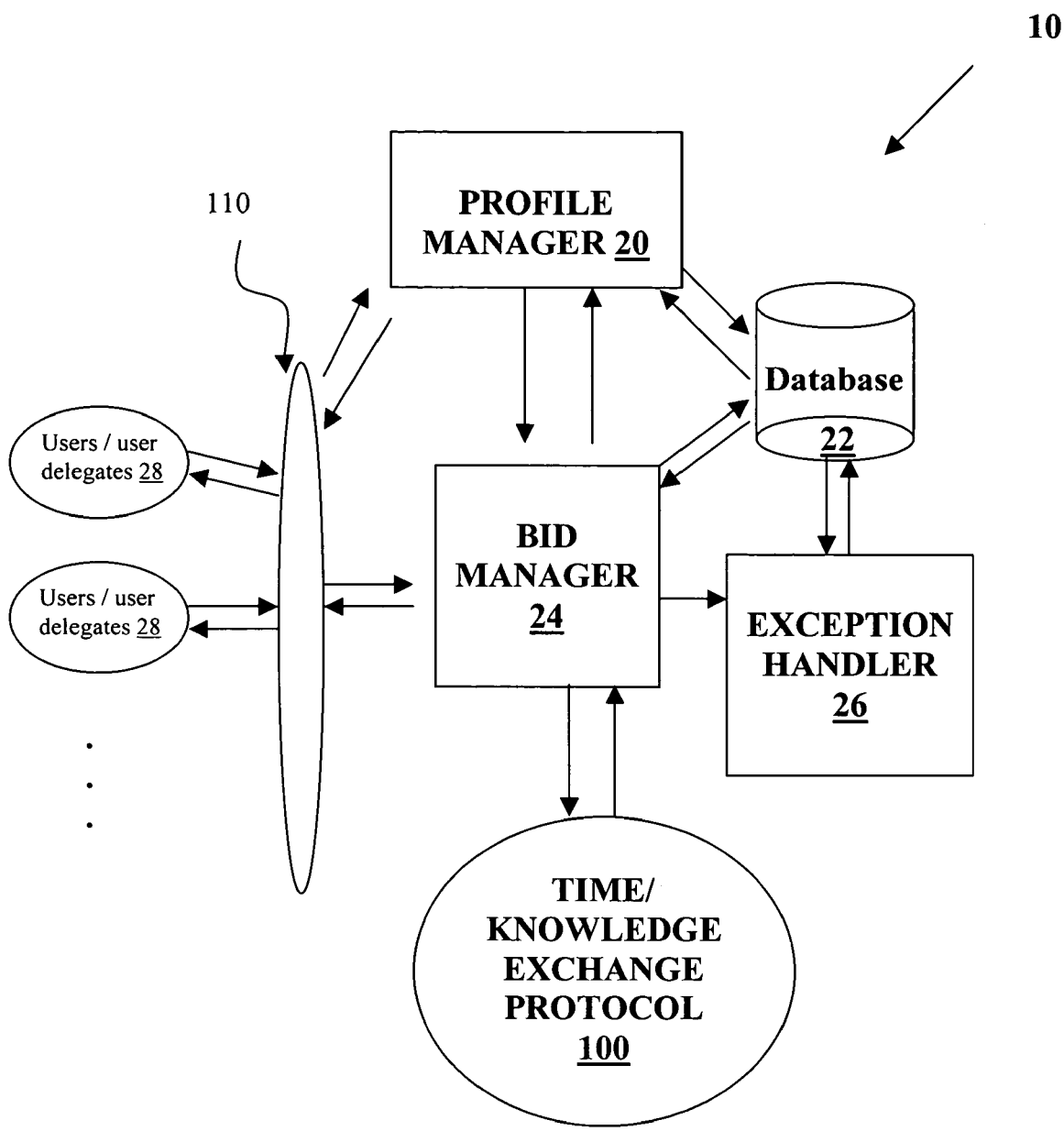
FIG. 1 is a schematic diagram illustrating the components of a knowledge management system in embodiments consistent with the present invention.

FIG. 1 is a schematic diagram illustrating the components of knowledge management system 10. System 10 may include profile manager 20, database 22, bid manager 24, and exception handler 26. In addition, the system may have access to a time/knowledge exchange protocol 100 to facilitate knowledge exchange. One or more users or user delegates 28 may access system 10 and communicate with system 10 or other users or user delegates, either directly or via a communication network 110. The following paragraphs will describe those components of system 10.

Users or User Delegates

Users or user delegates 28 shown in FIG. 1 may participate in knowledge exchange through knowledge management system 10. Users may directly access system 10, or have user delegates, which are the representatives or agents of users, to access and communicate with system 10. Although the term "users" generally refers to individuals, they may be machines that have the ability to handle projects, outsource projects or tasks, or take on assignment from other users, or machines that act under a user's authorization. A user delegate may be an individual or a machine that operates under a user's authorization. In one embodiment, a user delegate may be a "Chronobot," an electronic device that, depending on a user's delegation, may passively follow the user's specific instructions or actively serve as the user's agent to manage the user's time and/or knowledge and communicate, negotiate, and settle with other users or user delegates to facilitate knowledge and/or time exchange. A Chronobot may also be configured to serve many other functions a user desires.

For example, a Chronobot may allow a user to "store", "borrow", trade, exchange, and manage time, knowledge, or both. Borrowing means that a user may borrow time, knowledge, or both from another user and return time, knowledge, or both to that user later. During a bidding or trading process, a Chronobot may receive and process a bidder's or a potential bidder's information and interact with another Chronobot regarding a project listing. In addition, a Chronobot may include a time manager that facilitates the management of a user's time and other users' time through time and/or knowledge exchange. A Chronobot may also include a knowledge manager that may store knowledge, collect knowledge, label knowledge, organize knowledge, combine knowledge, and/or perform information or knowledge fusion to produce new knowledge.

In one embodiment, a Chronobot may offer a versatile virtual classroom that combines the functions of a chat room, a white board, a multimedia display device, a time manager, a knowledge manager, and a time and/or knowledge exchange device. With those capabilities, a Chronobot can interactively provide timely knowledge to one or more users or user delegates. To implement a Chronobot, a PC (personal computer), a notebook computer, a PDA (personal digital assistant), a mobile phone, or a processing device may be used, either by hardware configurations or software instructions.

Communication Network

Referring to FIG. 1, communication network 110 may include one or more communication mediums or systems to facilitate the communication between system 10 and users or user delegates 28 and the communication among users or user delegates 28. For example, communication network may include a wireless network, a wireless phone network, a wireless or wired LAN (local area network), the Internet, or a combination of any of them. Furthermore, in one embodiment, system 10 may also use communication network 110 to facilitate the communication among various components of system 10 or among two or more knowledge management systems.

Profile Manager

Referring again to FIG. 1, profile manager 20 may obtain, update, and manage user profile, update an associated database accordingly, and manage user registrations. Profile manager 20 may couple with database 22 or its own database to manage a user profile, such as name, user id, address (physical, mailing, e-mail, and/or IP), area of expertise, years or levels of experience in separate expertise areas, credit card information, and any other factors that system 10 may need for managing users or facilitating knowledge and/or time exchange. In addition to managing a user profile, profile manager 20 may authenticate users and update database regularly or upon requests. Profile manager 20 may also manage use's history with system 10 as part of a user profile. Example of a user's history may include bid or transaction history and feedback from other users, which may also be managed by a feedback manager that is a part of system 10, profile manager 20, or bid manager 24.

Bid Manager

Bid manager 24 shown in FIG. 1 may include a combination of one or more devices to serve multiple functions. In one embodiment, bid manager 24 may provide functions such as, receiving a project listing from a user; receiving a set of project parameters associated with the listing; providing a bidding room according to one or more of the project parameters; and revising project parameters in response to a user's request, potential bidders' or bidders' user profile, and/or bidding history. Additional functions of bid manager may include managing users' access to one or more bidding rooms or project listing and notifying users of relevant events. Further, bid manager 24 can also serve as a trade manager, which may facilitate direct trading without a bidding process. A plurality of bid listings and a plurality of bidding rooms may be managed simultaneously. In one embodiment, bid manager 24 may separate devices to manage different functions, such as an access control device, a notification device, a quality-of-bid manager, and a bid manager noted above. The following paragraphs will describe examples of project parameters and those devices.

When receiving a project listing, bid manager 24 may also receive from a user or a user delegate a set of project parameters that bid manager 24 may need for processing the listing. Bid manager 24 may create a bidding or trading room and manage a bidding process or a direct trade according to one or more of the project parameters. In one embodiment, those parameters may include one or more of the followings: user identification, bidding room identification, project description, a number of hours requested, a duration of a bidding process, an option to set a maximum price if a bidding fails, the maximum price, an option for a direct trade, a direct trade price, an option of allowing multi-tasking, identification of one or more expertise areas, one or more weight factors associated with one or more expertise areas, an identification of an experience level of the user in the expertise area, an identification of required years or levels in one or more experience areas, one or more weight factors associated with the years or levels, one or more weight factor associated with one or more user profile considerations, and key words that may facilitate listing search or system management.

Among the examples of project parameters, the option of allowing multi-tasking is an option of a user or a user delegate to allow multiple users to work on a project or different tasks or portions of the project. In addition, identification of one or more expertise areas relevant to or required to the project listed allows a user, a user delegate, or bid manager 24 to evaluate the fitness of a particular bidder to the project.

In one embodiment, one or more of the parameters may be used, and additional parameters may be set, as qualification parameters for setting criteria on controlling a potential bidders' access to a listing or a bidding room. For example, in addition to the parameters listed above, the qualification parameters may include parameters relating one or more of the following areas: a bidder's expertise area or areas, including skill, skill set, knowledge, and/or knowledge set, a bidder's prior experience, such as years or levels, on one or more areas, a bidder's availability, a bidder's feedback history, a bidder's default history, and a bidder's log-in status with system 10. With the project and/or qualification parameters, bid manager 24 may consider one or more of them and consider user profile to determine whether a user may access a particular listing or bidding room.

Associated with the identification of expertise area, the weight factors may include weight factors on various considerations, such as one or more of the project parameters and information from a user, that a user or a user delegate deem relevant in evaluating a bid. For example, weight factors associated with one or more user profile considerations allow the consideration of factors such as a bidder's feedback history, a bidder's success rate, and a bidder's default history. In addition, other weight factors allow the consideration and evaluation of a bidder's expertise area(s), a bidder's years or levels of experience in one or more expertise areas. In particular, a user or a user delegate may choose to apply only one weight factor on a bidder's expertise area(s) or separate weight factors on separate expertise areas. Similarly, a user or a user delegate may choose to apply only one weight factor on a bidder's levels or years of experience in expertise area(s) or separate weight factors on the levels or years of experience in separate expertise areas. The same implementation may also be used for other weight factors, such as one or more weight factors associated with user profile considerations.

An access control manager, which may be a part of bid manager 20, may control a user's access to a listing or a bidding room. Access control manager may verify a user's registration, a bidder's registration, and a potential bidder's qualification for a listing or a bidding room according to bidder profile and/or one or more of the project parameters associated with the listing or the bidding room. In addition, bid manager 20 may include a notification device, which may send users notifications to report separate events. Examples of notifications may include: a new listing notification notifying all users or qualified or selected users of a new project listing; a bid closing notice; a losing bid notice; a winning bid notice; a failed bid notice; a bid renewal notice; a bid retraction notice; a notice regarding requirements or delivery terms of a winning bid; a task completion notice, etc. Depending on the type of notice and the setup of system 10, those notices may be sent to user(s), user delegate(s), bidder(s), potential bidder(s), a user or a user delegate who provides a project listing, etc.

In addition to the access control manager and the notification device, bid manager 24 may include a quality-of-bid (QoB) manager for processing bidders' profiles and resolving a bid or facilitating the resolving of a bid according to one or more of the project parameters. For example, during, or at the end of, a bidding process, the QoB manager may consider one or more of the project parameters, including weight factor(s) on one or more considerations, of a particular listing to evaluate the "qualities" of bid submitted from bidders and identify if the most favorable bidder or bidders exist.

Exception Handler

Referring to FIG. 1, when an exception occurs, exception handler 26 may step in. In one embodiment, an exception may occur when one or more winning bidders default or break terms of a bid or when a bid fails, which occurs when no one bids, no bidder qualifies for a listing, or no bid satisfies the conditions set by a user or a user delegate. In addition, system 10 may delegate exception handler 26 to handle other functions handled or not handled by bid manager 24.

When a bidder defaults, exception handler 26 may seek another bidder or other bidders to take over part of a project or the entire project, start a renewed listing, or seek a paid expert to take over part of the project or the entire project. System 10 may have a list of experts who have different expertise in handling different types of projects. And it may store expert profiles in database 22. When a bidder defaults, exception handler may select one or more experts based on the project and/or qualification parameters set by the listing user. And the default bidder may be asked to pay for the expert's services with money or by contributing time and/or knowledge, such as by completing other projects.

In one embodiment, when bid manager 24 notifies exception handler 26 of a bidder default, exception handler 26 may compute the penalty that needs to be charged to the defaulter. For example, the default bidder's credit card listed in user profile and managed by profile manager 20 may be charged with the penalty. To deal with the bidder default, exception handler 26 may access database 22 to retrieve information related to experts who are capable and willing to work on the listed project and be paid for the work done. In one embodiment, exception handler 26 may use an appropriate algorithm to organize the list of experts based on their expertise areas and one or more of the project parameters, determine the number of hours needed for the expert work, and select one or more experts to complete the task.

If a bid fails, bid manager 24 may also notify exception handler 26 to handle it. A bidding process may fail for various reasons, such as, insufficient number of bids, lack of qualifying bidder, and lack of interested bidders. Exception handler 26 may communicate with a user or a user delegate regarding the possibility of revising project listing information and requirements, including some of the project parameters or qualification parameters. Alternatively, based on a user's or a user delegate's preference or instructions, exception handler 26 may use the expert selection procedure noted above to seek one or more experts to complete the project in the listing.

In summary, various users may bid their time during a bidding process. One or more bidders may be chosen as the winners by a bidding algorithm. The user who initiated the listing may then be informed of the final result of the bid and the winners, if any, while all the bidders may be informed of the results of their bids. In case one or more bid winner(s) default or break the terms of a bid, an exception handler may be called. A new bidding process may be started, or one or more experts may be selected and called to replace the defaulting bidder(s).

It is noted that the above descriptions of a knowledge management system are exemplary illustrations of embodiments consistent with the present invention. Skilled artisans in the relevant field may use different systems, devices, or software to implement the aforementioned functions and their variations. In addition, as noted above, a knowledge management system may facilitate the exchange of knowledge with ways other than bidding. For example, the system may handle direct trade or exchange by using the same devices as described above, and the variations and modifications known to skilled artisans are not described in detail. After describing the embodiments of a knowledge management system, the following paragraphs will illustrate a knowledge management method. In addition, an exemplary protocol and algorithm that may be used in implementing knowledge management system or method will be described.

Knowledge Management Method

Figure 2:
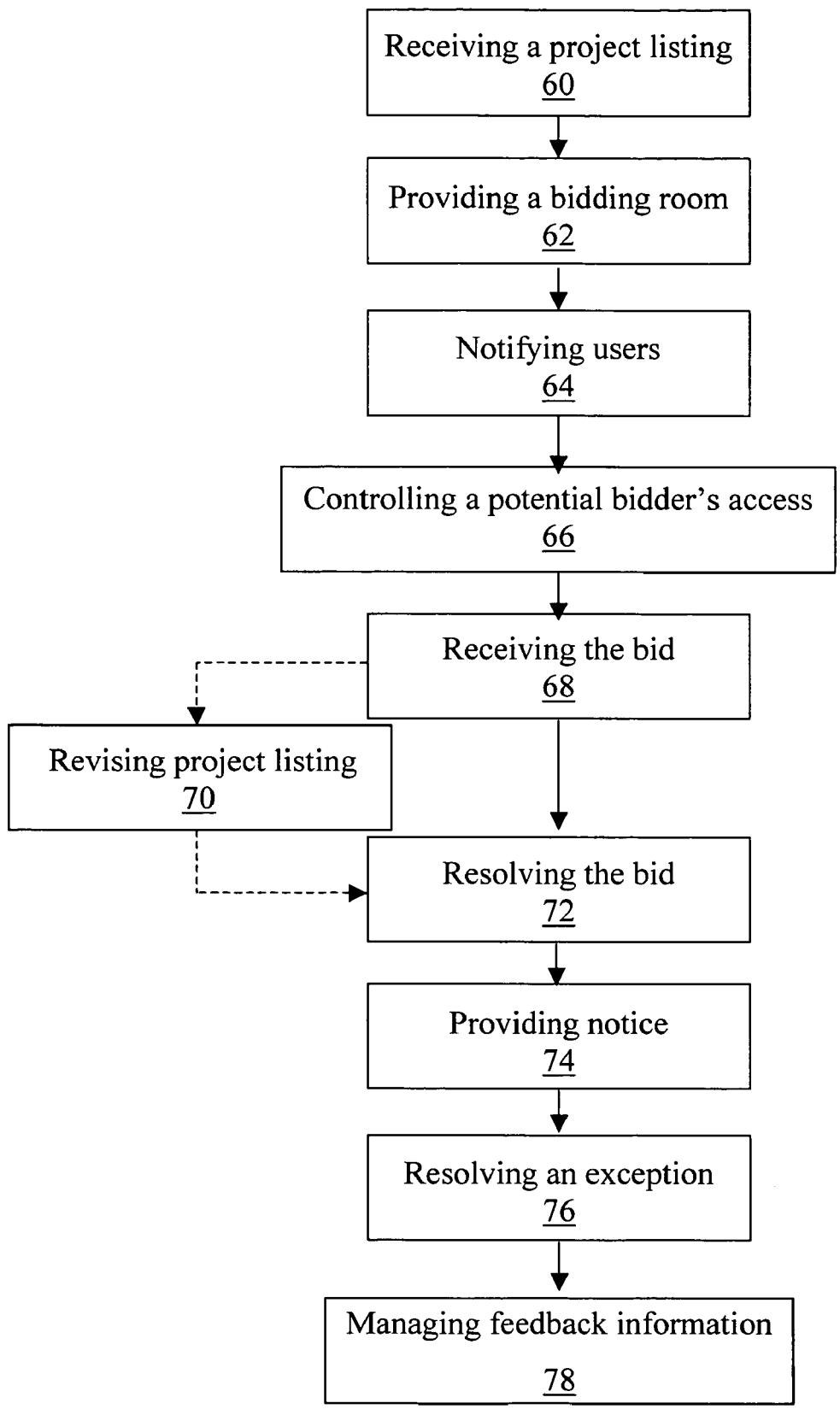
FIG. 2 is a schematic flow chart diagram of a knowledge management method in embodiments consistent with the present invention.

FIG. 2 is a schematic flow chart diagram of a knowledge management method in embodiments consistent with the present invention. In one embodiment, a knowledge management method may include one or more of: receiving a project listing at step 60; providing a bidding room at step 62; notifying users at step 64; controlling a potential bidder's access at step 66; receiving a bid at step 68; revising project listing at step 70; resolving the bid at step 72; providing a notice at step 74; resolving an exception at step 76; and managing feedback information at step 76. Many of the steps depicted in FIG. 2 and described below are merely exemplary and may be optional to a knowledge management method. In addition, a knowledge management method consistent with the present invention needs not follow the exemplary sequence of steps depicted in FIG. 2.

Referring to FIG. 2, at step 22, a project listing containing a set of project parameters may be received. A user or a user delegate may provide the project listing and the project parameters. The project parameters may include an identification of at least one expertise area associated with the project listed. In addition, as noted above, other examples of project parameters may include: user identification of a user or a user delegate providing the listing, bidding room identification, project description, a number of hours requested, a duration of a bidding process, an option to set a maximum price if the bidding fails, the maximum price, an option for a direct trade, a direct trade price, an option of allowing multi-tasking, an identification of at least one or more expertise areas, one or more weight factors associated with one or more expertise areas, an identification of an experience level of the user in the expertise area, an identification of required years or levels in one or more experience areas; one or more weight factors associated with the years or levels, one or more weight factor associated with one or more user profile considerations, and key words. Further, the project parameters may also include one or more qualification parameters for setting criteria for qualifying a bidder access to the project listing. Examples of qualifying parameters are noted above. In one embodiment, a user may initiate a bidding or trading process by providing a project listing and one or more of the parameters listed above.

After receiving the project listing at step 60, a bidding room may be provided according to the project parameters. A new bidding room may be set up for the particular listing, or an existing bidding room containing similar listings may be provided to include the listing.

At step 64, all users or user delegates, or only those who are qualified to access or submit a bid, may be notified. Recipients of notices may be selected according to one or more of the project parameters and user profile.

At step 66, a knowledge management method may control a potential bidder's access according to the project parameters. For example, the step may include verifying a potential bidder's registration and/or allowing a potential bidder's access to the project listing according to the user profile of the potential bidder and one or more the project parameters. The access control may include limiting one's access to a particular bidding room or a particular project listing.

At step 68, a bid may be received from a bidder having access to the listing. In one embodiment, a qualifying user or user delegate may submit a bid. Also, multiple bids may be received from one or more bidders. In some cases, a listing may receive no bid for lack of qualifying bidders or for lack of interests. In one embodiment, if the listing allows multi-tasking, a bidder may bid for only a portion of the listed project, such as a portion of the time requested by the project or a specific task or part of the project. In addition, a bid may be a direct trade request that bypasses a bidding process and allows a direct trade between two or more users or user delegates. In one embodiment, a project listing may be received via a communication network, such as a communication network including one or more of: a wireless network, a wireless phone network, a wireless or wired LAN (local area network), and the Internet.

At step 70, the project listing, including the associated project parameters, may be revised. Some limitations may be set to limit the revisions of the project listing by a user, user delegate, or a system managing a knowledge management method. Also, the project listing may be revised according to a listing revision request from the user, the user delegate, or the system, according to the profile of potential bidders or bidders, bidding conditions or history, which may include the lack of interests, lack of qualifying bidders, or insufficiency in qualifying bidders.

At step 72, a bid, or multiple bids, may be resolved. In one embodiment, the bid(s) may be resolved according to one or more of the project parameters. For example, as noted above, the quality of the bids may be computed according to bidders' profile and one or more the project parameters, including one or more weight factors on bidders' expertise area, on bidders' levels or years of experience, and on considerations associated with a bidder's profile. The computation may then identify if one or more favorable bidders exist. In an embodiment where multi-tasking is allowed or where the project contains multiple tasks that may be handled by separate bidders, two or more favorable bidders may be identified and selected as the winning bidders.

Step 72 of providing one or more notices may, depending on the type of notices to be sent, occur at different timings. Example of notices provided may include: a project listing notice, a bid closing notice, a losing bid notice, a winning bid notice, a failed bid notice, a bid renewal notice, a bid retraction notice, a notice regarding requirements or delivery terms of a winning bid, a task completion notice, and etc. In one embodiment, a project listing notice may be generated and sent to all users, users who currently logged in, or users who are qualified for the listing. A bid closing notice may be sent to the bidders and the user or the user delegate who provided the listing.

At step 76, an exception, such as a failed bid, a default bidder, and other conditions causing unexpected or unfavorable result of a bidding process, may be resolved. As noted above, an exception resolution may include one or more of: replacing the default bidder with one or more other bidder, users, or user delegates; renewing the project listing; creating a new project listing; locating one or more suitable users to take over; and locating one or more experts to take over. At step 78, feedback information relating to a bid or a uncompleted or completed projected may be managed. For example, the initiating user or user delegate (who initiate the listing) may submit a feedback to comment on one or more winning bidders after the project is completed, defaulted, or ended. And the feedback information may be managed together with or as part of user profile of users.

Protocol

As an exemplary illustration, the followings describe a time and/or knowledge exchange protocol, such as protocol 100 depicted in FIG. 1, that may be implemented in one embodiment. Without limiting the scope of the present invention, the following examples use a system and a method with Chronobot, a user delegate, to illustrate the protocol.

When a Chronobot enters a bid for time/knowledge exchange, other Chronobots may respond and the time/knowledge exchange protocol may be used to settle the bid. The Time/Knowledge exchange protocol may specify what are to be done under different conditions. In one embodiment, the protocol may provide, or instruct components of a knowledge management system to provide, the following functions: (1) deciding whether a Chronobot wanting to bid may proceed to do so based on user profile information; (2) deciding which Chronobot(s) may participate in a particular bidding process or bidding room; (3) specifying an order in which Chronobots may take part in the bidding process; (4) validating a bid from a Chronobot; (5) specifying the order of how various bids are presented to the Chronobot initiating the listing; (6) notifying the initiating Chronobot when another Chronobot that had bid earlier wants to retract its bid; (7) determining which Chronobot(s) will be assigned with a listed project; (8) notifying the Chronobot(s) that are selected for the project, and if a Chronobot refuses to honor the bid, updating the corresponding user profile with default information and dealing with the exception, such as by creating a new listing; (9) if the selected Chronobot(s) accept the project, notifying the initiating Chronobot of the acceptance; (10) notifying other Chronobots that participated the bidding process of the result; (11) if any of the Chronobot(s) does not complete the project or fails to satisfy the requirements of the project, updating user profile accordingly; and, if the initiating Chronobot still needs the project to be completed, handling the exception; (12) after the Chronobot(s) perform the requested task, updating user profile; (13) notifying the initiating Chronobot that the project has been completed.

Algorithm for Time/Knowledge Exchange

An algorithm may be designed to perform the aforementioned tasks. For example, there may be an algorithm that compares the requirements of the initiating Chronobot and the user profile of the Chronobot(s) proposing to perform the task. In one embodiment, an algorithm may consider the specifications of a protocol and may provide a way to settle the bid among Chronobots. As an example, the algorithm may be a constraint satisfaction algorithm that interoperates with the Chronobots and coordinates the settlement of a bid in a distributed manner. In one embodiment, it may select the most favorable bid or bids using a QoB (Quality of Bid) metric.

In one embodiment, a self-model of a Chronobot includes the current set of values for various criteria, such as expertise area, experience level, and history of a bidder, and the weight factors that the Chronobot assigns to each of those criteria. In addition, an alien-model of a Chronobot includes the current set of values that the various Chronobots taking part in the bidding process assign to the multitude of criteria specified by the Chronobot initiating the bid. For example, a Chronobot model may be a 6-tuple (M, S, $f$, $s_0$, F, DB)

Where

M is a non-empty set of messages (the message space); and

S is a non-empty set of states (the state space), $S=S_c*D_s*D_a$.

Where $S_c$ is a nonempty set of states of the Chronobot;

$D_s$ is a nonempty set of self-models of the Chronobot; and $D_a$ is a nonempty set of alien-models of the Chronobot.

$f: S_c(M*M)*\rightarrow S_c$ is the state transition function. Given the current state of the Chronobot and the history of messages exchanged between the initiating Chronobot and the participating Chronobots, f specifies the next state.

$s_0$ in S is the initial state of the Chronobot;

F, a subset of S, is the nonempty set of final states; and

DB is the Database that stores the history of all the Chronobots involved in the Time/Knowledge Exchange.

Figure 3:
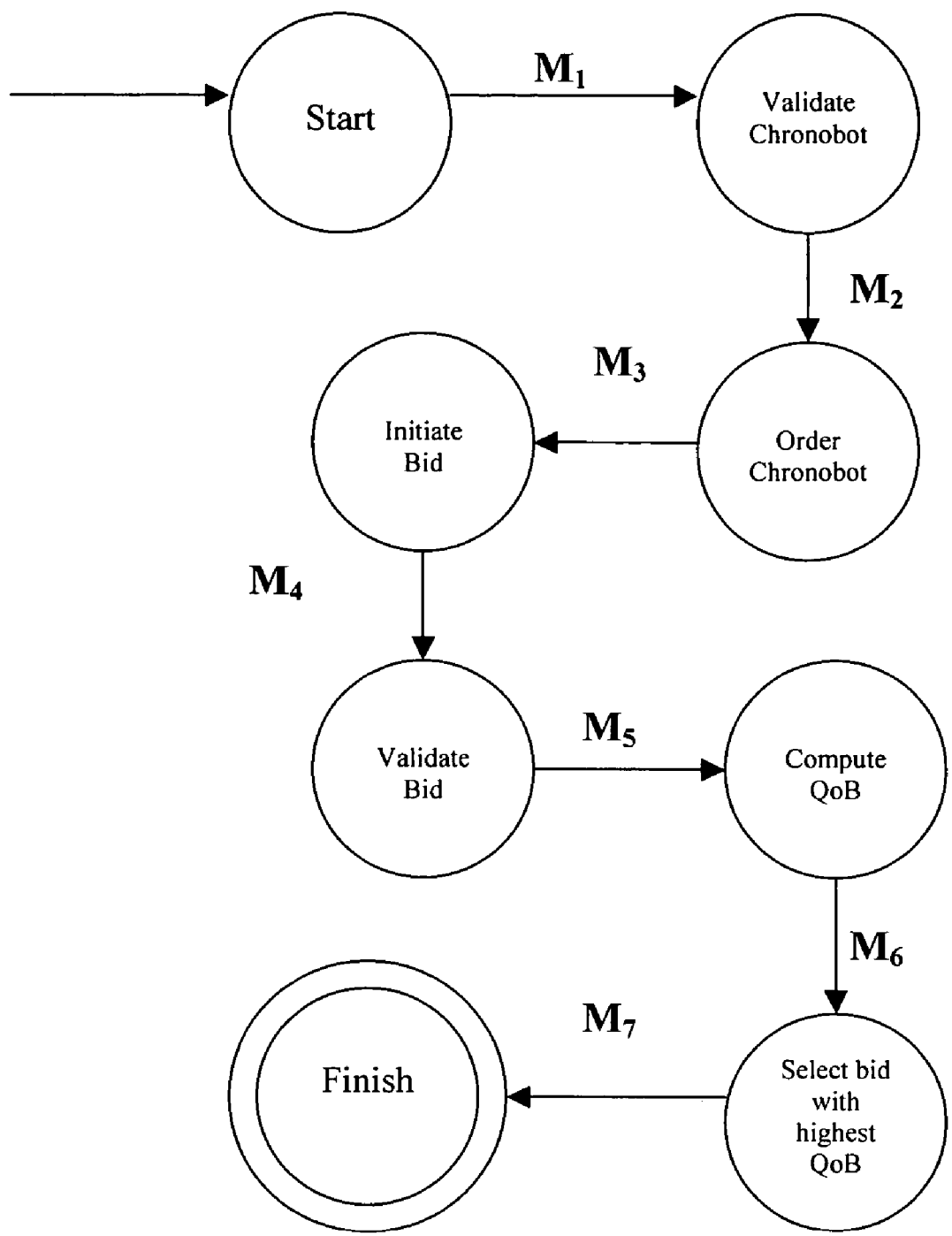
FIG. 3 depicts a schematic flow diagram illustrating exemplary messages of a bidding process in embodiments consistent with the present invention.
Figure 4:
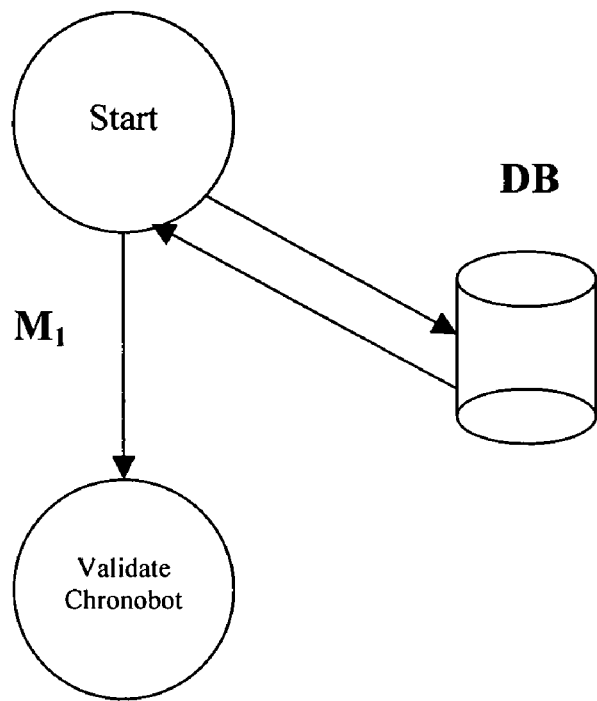
FIG. 4 illustrates validating message M1 in embodiments consistent with the present invention.

FIGS. 3-8 provide schematic diagram illustrating exemplary messages and flow of messages that may be used in settling a bid. FIG. 3 depicts a schematic flow diagram a bidding process in embodiments consistent with the present invention. In one embodiment, one or more messages, such as messages among components of a knowledge management system or between the system and users or user delegates, may be provided to facilitate a bidding process. FIG. 4 illustrates validating message M1. At the initiation of a project listing, the database containing user profile may be accessed and message M1 may used to validate a Chronobot that submits a project listing for a bidding or trading process.

Figure 5:
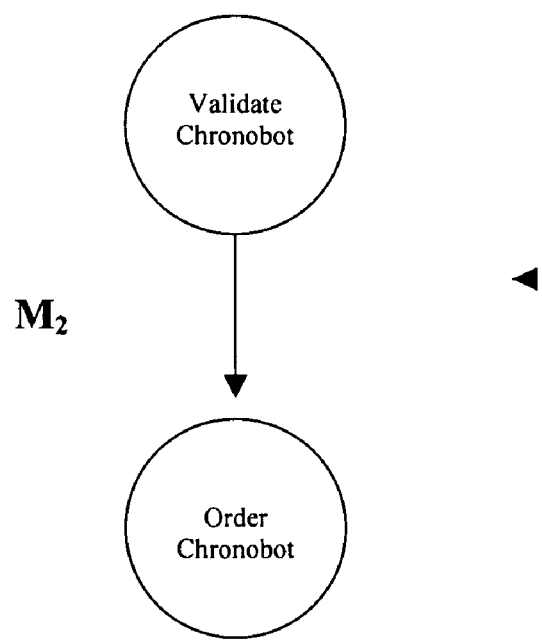
FIG. 5 illustrates enabling message M2 in embodiments consistent with the present invention.
Figure 6:
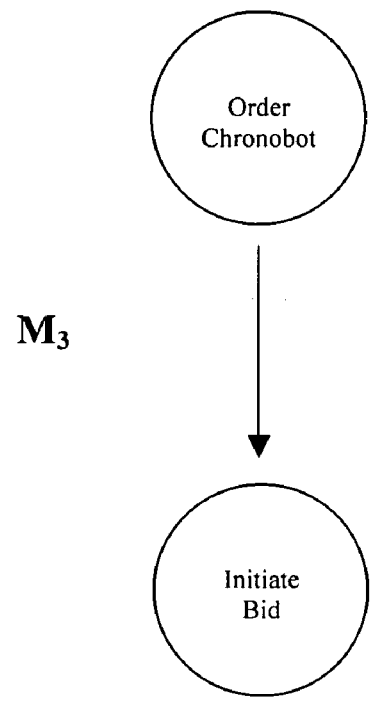
FIG. 6 illustrates bid-entering message M3 in embodiments consistent with the present invention.
Figure 7:
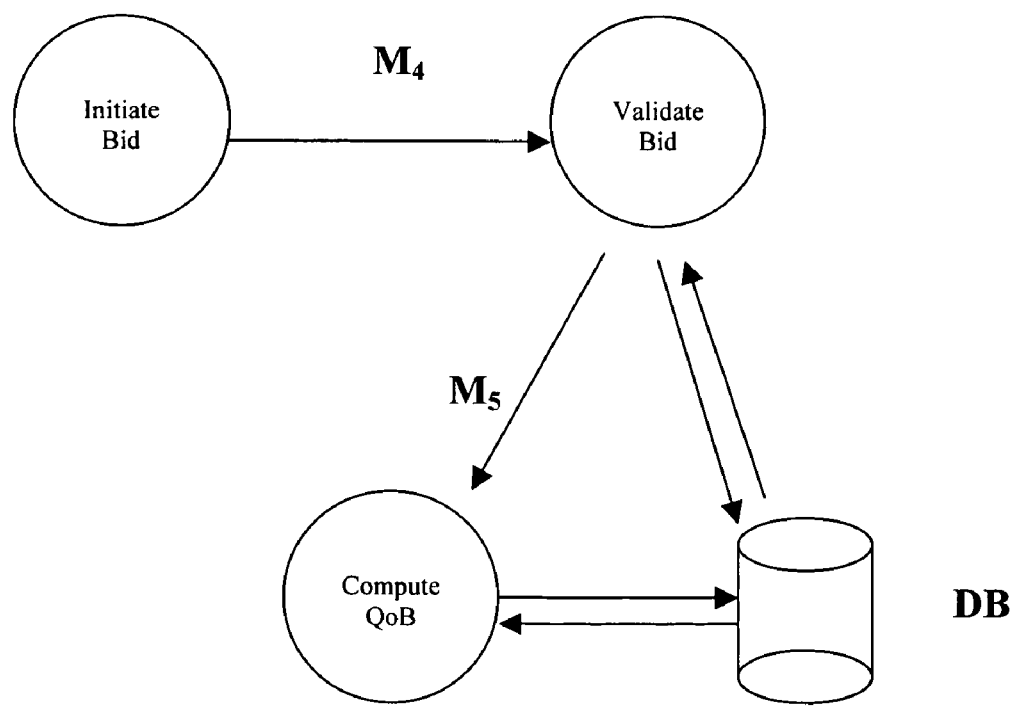
FIG. 7 illustrates bid-validating message M4 and QoB (quality-of-bid) message M5 in embodiments consistent with the present invention.

FIG. 5 illustrates enabling message M2. It may be used to enable other Chronobots' participation or access of a bidding process or a bidding room in a distributed manner. FIG. 6 illustrates bid-entering message M3. It may signal one or more participating Chronobots to start entering their bids or signal the submission of a bid. FIG. 7 illustrates bid-validating message M4 and QoB message M5. Bid-validating message M4 may be used to validate one or more bids are submitted by participating Chronobots, and QoB message M5 may be used to compute or initiate the computation of QoB (quality-of-bid) results through accessing information in database DB.

Figure 8:
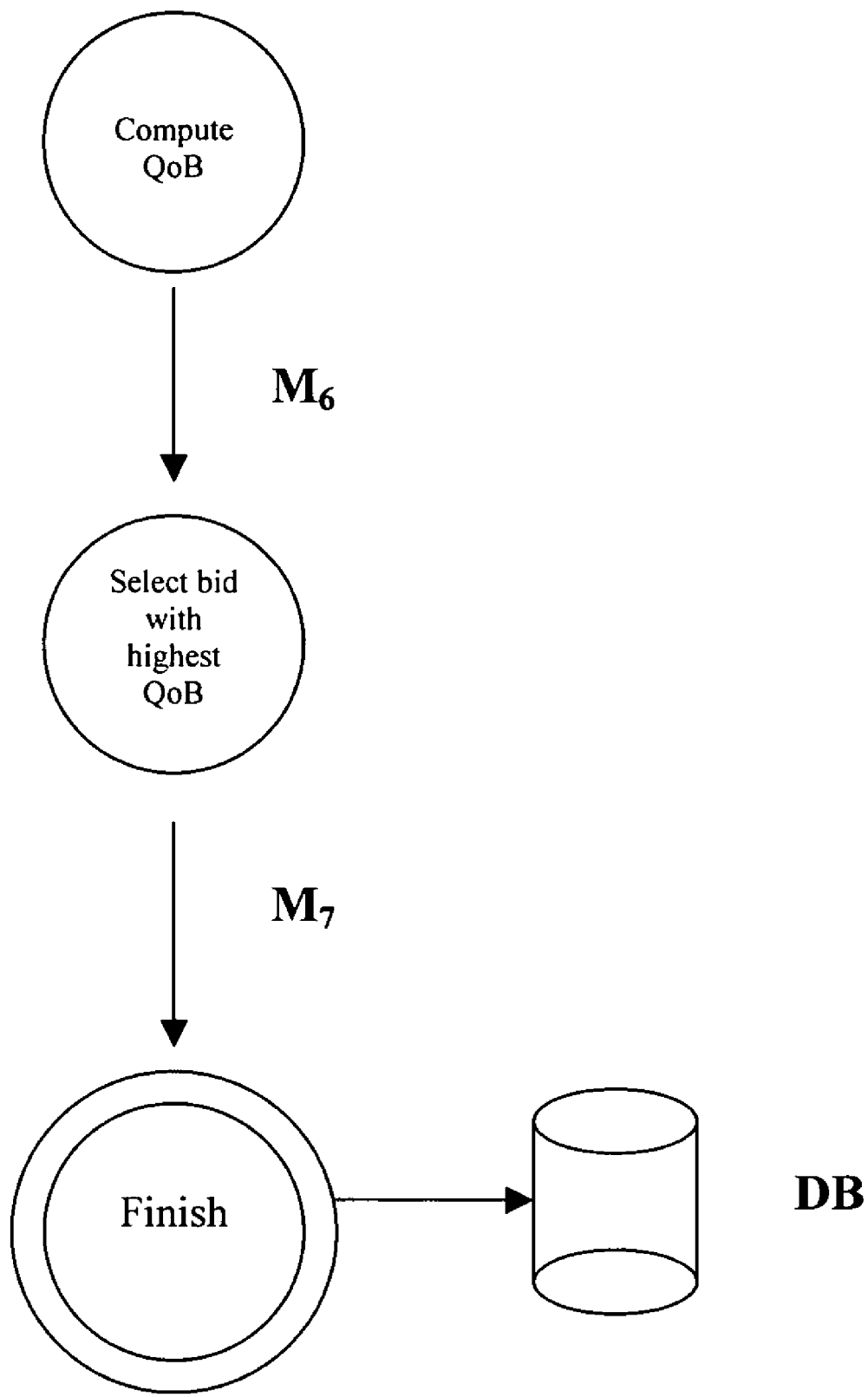
FIG. 8 illustrates notifying message M6 and announcing message M7 in embodiments consistent with the present invention.

FIG. 8 illustrates notifying message M6 and announcing message M7. Message M6 may be used to identify the QoB result, and message M8 may be used to announce one or more winning bidder(s) or Chronobot(s). Thereafter, database DB may then be updated accordingly.

QoB Algorithm

A QoB computation may employ a technique based on a multi-expert (or expertise) weight update to select the most favorable Chronobot(s) to take over a project. The following paragraphs illustrate an exemplary embodiment.

The "experts" used in QoB algorithm are criteria for making predictions; denoted by vector $(x_t)$. Weights of experts $(w_t)$ represent their quality of predictions. A Master Algorithm predicts with a weighted average of the experts' predictions:

$$y_t = w_t \cdot x_t$$

Depending on the outcome $(\acute{y}_t)$, the weights of the experts are updated.

$$\acute{y}_t = w_{t+1} \cdot x_{t+1}$$

Using this method, a system improves itself in the form of a feedback-based approach. Different approaches may apply to generate the weight update. One approach, known as Loss Update and a Weighted Majority Algorithm, may use the following formula for weight update.

$$w_{t+1}, i := w_t, i \cdot e^{-\eta Lt, i} \text{ for } i=1 \ldots n$$

$$\text{Normalization } (\Sigma wt, i)$$

where:

η (eta)=the learning rate

W0=(1/n, 1/n, . . . , 1/n)→weights initialized equally

In some embodiments, Loss Update may learn too fast, but does not recover fast enough:

$$(e^{-\eta Lt, I} = e^{-1} \approx 1/2.7).$$

Another approach, known as Share Updates, may be used. Its motivation comes from biological competition for shares of resources. For example, one may imagine all cached policies as species competing for food (credits in the equation) in habitat (the criteria involved for selection). The fitness of a species is based on how well it eats. In the context the this embodiment, fitness of a species is its weight assigned by a user. The population share (or frequency) of a species depends on its fitness. A highly fit species may starve others, and if conditions do not change, the whole system collapses. Predators (probabilistically) prey on the most frequent (or easy) species. Predators protect diversity among species by preventing the most fit species from starving others. Our predator implementation assigns the credits to the various criteria. The followings describe one implementation.

First, a pool may be created from the shared weights. The algorithms may then be forced to share in proportion to their loss. Weights are redistributed from the pool to make sure all policies have some minimal weight ($w_{t+1}$,i). Applying Share Updates to the weight update noted above, a general algorithm may be derived.

Several procedures may be set as follows:

Let UPDATE_USER_PROFILE( ) be the procedure that updates the user profile of Chronobots participating in the system.

Let ORDER_CHRONOBOTS( ) be the procedure that globally orders the various Chronobots participating in the system.

Let VALIDATE_BID(k) be the procedure that validates the bids of the various Chronobots.

Let VALIDATE_CHRONOBOT(k) be the procedure that validates the Chronobots that want to participate in the bidding process.

Let Chronobot (i) denote the one initiating the bid.

In one embodiment, an algorithm may follow the procedure below:

Step 1. Chronobot (i) initiates the bid for a task.

Step 2. For each Chronobot (j) wanting to participate in the bidding process, call VALIDATE_CHRONOBOT(j) to validate each of the Chronobots that wants to participate in the bidding process.

Step 3. Call ORDER CHRONOBOTS( ) to order the Chronobots wanting to participate in the bidding process.

Step 4. For each bid k initiated, call VALIDATE_BID(k) to validate the bid originating from Chronobots.

Step 5. Compute the following for each bid that has been initiated in order to compute the QoB (Quality of Bid):

$$QoB(i) = W_1 * C_1 + + W_2 * C_2 + \ldots + W_n * C_n,$$

Where:
$C_1, C_2, \ldots C_n$ are the various parameters or criteria for evaluating and selecting one or more bid(s). For example, $C_1, C_2, \ldots C_n$ may include some of the project parameters and user profile considerations noted above, such as identification of one or more expertise areas, identification of experience level(s) of a user in one ore more expertise areas, and one or more considerations relating to a user profile (e.g. feedback information, default history, etc.).

$W_1, W_2, \ldots W_n$ are the weights associated with various criteria. For example, $W_1, W_2, \ldots W_n$ may include the weight factors noted above, such as one or more weight factors associated with one or more expertise areas, one or more weight factors associated with one or more experience levels in one or more expertise areas, one or more weight factors associated with a user profile.

Step 6. Select the bid(s) with the highest QoB(s) and present it to the initiating Chronobot. The bids may then be resolved accordingly.

Step 7. If the initiating Chronobot agrees to the resolution, mark the bid as resolved and inform all other Chronobots accordingly.

Step 8. After the task has been completed, update weights accordingly.

Step 9. If any of the selected Chronobot(s) defaults or withdraws from the project, repeat steps 1 through 8.

Therefore, a bidding process may be resolved with the exemplary procedure above. Two examples are provided with Chronobot, a user delegate, to illustrate the use of a system or a method for managing time, knowledge, or both.

EXAMPLES

John is a teenager. His parents recently bought him a Chronobot. When John wakes up in the morning, he has breakfast and then takes the bus to the school. On the bus John has some free time. So his Chronobot says to John: "Hey dude, you know you have to write a big report on the eating habits of dinosaurs tonight. Why don't you spend some time now to collect some information? There is a rock concert at Point Park tonight. If you get the report done early, maybe your mom will let you go to the rock concert!" John is excited about the rock concert and really wants to go, so he follows the Chronobot's advice and puts in some effort to collect and organize information. After the second class period, John again has some free time. Again, following the Chronobot's advice, John puts in some time to get more pieces of information and label them according to the Chronobot's suggestions.

John's efforts later pay off. After John finishes school he turns to the Chronobot who, to his delight, has fused the knowledge together to form a rough draft of the report. John only has to do some editing and, in less than twenty minutes, the report is completed! But some critical facts need to be checked by John's teacher. So John goes to Chronobot's virtual classroom to interact with his teacher Ms. Newman. In ten minutes, John gets all the answers from Ms. Newman. (Unknown to John, it is actually Ms. Newman's Chronobot serving as a surrogate to answer his questions, but this does not matter.) It is only six thirty pm, and John proudly shows off the finished report to his mother, who approves John's request for an outing. So John happily goes to the rock concert with his buddies. If John does not have the Chronobot, he would be stuck with the report writing task the entire evening and misses the rock concert!

As another example, for professional media artist George, Chronobot serves the same function of timely knowledge gathering. But it can be even more useful, because unlike the teenager who is required to do his homework by himself, George has no such constraints and can rely upon the support from his coworkers. However there is no free lunch. In order to ask his coworkers Suzie and Bill to share his workload, George has to put in efforts either earlier (i.e. in the past time) or later (i.e. in the future time) to help them. But at the present time, when George needs help, Suzie and Bill will put in their efforts to help George. Through their Chronobots, George, Suzie and Bill interact in the virtual classroom. The Chronobots in turn through their masters' conversation figure out what they are expected to do. They work independently to retrieve the knowledge previously organized by their respective masters, and then work together to fuse the knowledge into a format useful for George to put in the finishing touches.

In the two examples described above, the user's close supervision and/or delegation of Chronobots may be essential for the Chronobot to accomplish timely knowledge generation. In some embodiments, a Chronobot may collect a lot of irrelevant information for lack of users supervision, making subsequent information fusion more difficult. Timely knowledge generation may depend on a Chronobot's ability for information fusion. Chronobot may also be very useful for enhancing human interactions as well.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification or the figures should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A computerized system for knowledge management, comprising:
a processing device, the processing device comprising:
a profile manager for managing user profiles; and
a bid manager for receiving a project listing from a user delegate and a set of project parameters associated with the listing, the bid manager providing a bidding room according to at least one of the project parameters, the bid manager comprising:
an access control manager for verifying a user's registration, verifying a bidder's registration, controlling a bidder's access to the project listing according to a user profile and at least one of the project parameters, and receiving a bid from a bidder having access; and
a quality-of-bid manager for computing a quality of the bid based on the user profile of the bidder having access and at least one of the project parameters, and resolving the bid based on the quality of the bid; and
an exception handler coupled to the bid manager and configured to resolve an exception to the bid by computing a penalty associated with the exception and assessing the penalty to a defaulting bidder,
wherein the project parameters include an identification of at least one expertise area associated with a project, a weight factor associated with the expertise area, and at least one weight factor associated with the user profile of the bidder having access; and
further wherein the quality-of-bid manager manages feedback information associated with the resolved bid, the managing comprising:
computing updated weight factors based on the managed feedback information, the resolved bid, and a learning rate associated with the weight factors.

2. The system of claim 1, wherein the quality-of-bid manager computes the quality of the bid using a formula of $$QoB(i) = W_1 * C_1 + + W_2 * C_2 + \ldots + W_n * C_n,$$

wherein:
$C_1, C_2, \ldots C_n$ comprise at least one of the project parameters and at least one consideration of the profile of the bidder, and $W_1, W_2, \ldots W_n$ comprise at least one weight factor associated with the expertise area and at least one weight factor associated with the profile of the bidder.

3. The system of claim 1, wherein the quality-of-bid manager computes the quality of the bid using a multi-tuple comprising at least $(M, S, f, s_0)$, wherein:
M is a non-empty set of messages;
S is a non-empty set of states, with $S = S_c * D_s * D_a$;
$S_c$ is a nonempty set of states of the user delegate;
$D_s$ is a nonempty set of self-models of the user delegate;
$D_a$ is a nonempty set of alien-models of the user delegate;
$f: S_c * (M*M)* \rightarrow S_c$ is a state transition function for specifying a next state; and
$s_0$ in S is the initial state of the user delegate.

4. The system of claim 1, wherein the project parameters further comprise an identification of an experience level of a user in the expertise area, a weight factor associated with the experience level, at least one qualification parameter setting criteria for qualifying a bidder's access to the project listing, and an option of allowing multi-tasking.

5. The system of claim 1, wherein the project parameters further comprise at least one of: user identification, bidding room identification, project description, a number of hours requested, a duration of a bidding process, an option to set a maximum price if a bidding fails, the maximum price, an option for a direct trade, a direct trade price, and key words.

6. The system of claim 1, wherein the bid manager revises one or more of the project listing and the project parameters in response to at least one of: a listing revision request, the user profile, or bidding history.

7. The system of claim 1, wherein the bid manager comprises a notification device for sending at least one of: a project listing notice, a bid closing notice, a losing bid notice, a winning bid notice, a failed bid notice, a bid renewal notice, a bid retraction notice, a notice regarding requirements or delivery terms of a winning bid, or a task completion notice.

8. The system of claim 1, further comprising a feedback manager for managing feedback information of users.

9. The system of claim 1, wherein the exception handler is further configured to resolve the exception by at least one of: replacing a default bidder; renewing the project listing; creating a new project listing; locating a suitable user to take over; or locating an expert.

10. The system of claim 1, further comprising a database coupled with at least one of the profile manager and the bid manager for storing information.

11. The system of claim 1, further comprising a user delegate representing a user to conduct at least one of: receiving bidder information, processing bidder information, or communicating with a bidder comprising a user or a user delegate.

12. The system of claim 1, further comprising a communication network for facilitating the communication between the system and a user or a user delegate, the communication network comprising at least one of: a wireless network, a wireless phone network, a local area network, and the Internet.

13. A computerized system for knowledge management comprising:
a processing device, the processing device comprising:
a profile manager component for managing user profiles;
a bid manager component for:
receiving, from a computer of a user delegate, a project listing and a set of project parameters associated with the listing, wherein the project parameters include an identification of at least one expertise area associated with a project, providing a bidding room according to at least one of the project parameters, and receiving a bid from a computer of a bidder;

a quality-of-bid manager component for computing a quality of the bid based on a user profile of the bidder and at least one of the project parameters, and resolving the bid based on the quality of the bid; and an exception handler component coupled to the bid manager component and configured to resolve an exception to the bid by computing a penalty associated with the exception and assessing the penalty to a defaulting bidder, wherein the project parameters include a weight factor associated with the expertise area and at least one weight factor associated with the user profile of the bidder; and further wherein the quality-of-bid manager component manages feedback information associated with the resolved bid, the managing comprising:

computing updated weight factors based on the managed feedback information, the resolved bid, and a learning rate associated with the weight factors.

14. The system of claim 13, wherein the quality-of-bid manager component computes the quality of the bid using a formula of:

$$QoB(i) = W_1 * C_1 + + W_2 * C_2 + \ldots + W_n * C_n,$$

wherein:

$C_1, C_2, \ldots C_n$ comprise at least one of the project parameters and at least one consideration of the profile of the bidder, and $W_1, W_2, \ldots W_n$ comprise at least one weight factor associated with the expertise area and at least one weight factor associated with the profile of the bidder.

15. The system of claim 13, wherein the quality-of-bid manager component computes the quality of the bid using a multi-tuple comprising at least $(M, S, f, s_0)$, wherein:

M is a non-empty set of messages;

S is a non-empty set of states, with $S = S_c * D_s * D_a$;

$S_c$ is a nonempty set of states of the user delegate;

$D_s$ is a nonempty set of self-models of the user delegate;

$D_a$ is a nonempty set of alien-models of the user delegate;

$f: S_c * (M*M)* \rightarrow S_c$ is a state transition function for specifying a next state; and $s_0$ in S is the initial state of the user delegate.

16. The system of claim 13, wherein the project parameters further comprise an identification of an experience level of a user in the expertise area, a weight factor associated with the experience level, at least one qualification parameter setting criteria for qualifying the bidder's access to the project listings, and an option of allowing multi-tasking.

17. The system of claim 13, wherein the project parameters further comprise at least one of: user identification, bidding room identification, project description, a number of hours requested, a duration of a bidding process, an option to set a maximum price if a bidding fails, the maximum price, an option for a direct trade, a direct trade price, or key words.

18. The system of claim 13, wherein the bid manager component revises one or more of the project listing and the project parameters in response to at least one of: a listing revision request, the user profile, or bidding history.

19. The system of claim 13, wherein the bid manager component comprises an access control manager component for controlling user access by at least one of: verifying a user's registration, verifying the bidder's registration, or controlling the bidder's access to the project listing according to the user profile and at least one of the project parameters.

20. The system of claim 13, wherein the bid manager component comprises a notification device for sending at least one of: a project listing notice, a bid closing notice, a losing bid notice, a winning bid notice, a failed bid notice, a bid renewal notice, a bid retraction notice, a notice regarding requirements or delivery terms of a winning bid, or a task completion notice.

21. The system of claim 13, further comprising a feedback manager component for managing feedback information of users.

22. The system of claim 13, wherein the exception handler component is further configured to resolve the exception by at least one of: replacing a default bidder; renewing the project listing; creating a new project listing; locating a suitable user to take over; or locating an expert.

23. The system of claim 13, further comprising a database coupled with at least one of the profile manager or the bid manager for storing information.

24. The system of claim 13, further comprising a user delegate computer representing a user to conduct at least one of: receiving bidder information, processing bidder information, or communicating with a bidder comprising a user or a user delegate.

25. The system of claim 13, further comprising a communication network for facilitating the communication between the system and a user or a user delegate, the communication network comprising at least one of: a wireless network, a wireless phone network, a local area network, or the Internet.

26. A computer-implemented method for knowledge management, the method comprising the steps of:

receiving, from a computer of a user delegate, a project listing containing a set of project parameters including an identification of at least one expertise area associated with a project and a weight factor associated with the expertise area;

providing, using a processing device, a bidding room according to at least one of the project parameters;

controlling, using the processing device, a bidder's access according to a profile of the bidder and at least one of the project parameters;

receiving, using the processing device, a bid from a bidder having access;

resolving, using the processing device, the bid according to the profile of the bidder having access and at least one of the project parameters, wherein the set of project parameters includes a weight factor associated with the profile of the bidder having access;

managing feedback information associated with the resolved bid using the processing device, wherein the managing comprises:

computing updated weight factors based on the managed feedback information, the resolved bid, and a learning rate associated with the weight factors; and resolving an exception to the bid using the processing device, wherein the resolving step comprises computing a penalty associated with the exception and assessing the penalty to a defaulting bidder.

27. The method of claim 26, wherein resolving the bid further comprises computing a quality of the bid using a formula of:

$$QoB(i) = W_1 * C_1 + + W_2 * C_2 + \ldots + W_n * C_n,$$

wherein:
$C_1, C_2, \ldots C_n$ comprise at least one of the project parameters and at least one consideration of the profile of the bidder, and
$W_1, W_2, \ldots W_n$ comprise at least one weight factor associated with the expertise area and at least one weight factor associated with the profile of the bidder.

28. The system of claim 26, wherein the resolving step further comprises computing the quality of the bid using a multi-tuple comprising at least $(M, S, f, s_0)$, wherein:
M is a non-empty set of messages;
S is a non-empty set of states, with $S = S_c * D_s * D_a$;
$S_c$ is a nonempty set of states of the user delegate;
$D_s$ is a nonempty set of self-models of the user delegate;
$D_a$ is a nonempty set of alien-models of the user delegate;
$f: S_c*(M*M)* \rightarrow S_c$ is a state transition function for specifying a next state; and
$s_0$ in S is the initial state of the user delegate.

29. The method of claim 26, wherein the project parameters further comprise an identification of an experience level of a user in the expertise area, a weight factor associated with the experience level, at least one qualification parameter setting criteria for qualifying the bidder's access to the project listing, and an option of allowing multi-tasking.

30. The method of claim 26, wherein the project parameters further comprise at least one of: user identification, bidding room identification, project description, a number of hours requested, a duration of a bidding process, an option to set a maximum price if a bidding fails, the maximum price, an option for a direct trade, a direct trade price, or key words.

31. The method of claim 26, further comprising notifying, using the processing device, qualifying bidders according to at least one of the project parameters.

32. The method of claim 26, wherein controlling the bidder's access comprises at least one of: verifying the bidder's registration and controlling the bidder's access to the project listing according to the user profile of the bidder having access and at least one of the project parameters.

33. The method of claim 26, wherein receiving the bid comprises receiving the bid only from a qualifying bidder.

34. The method of claim 26, further comprising providing, using the processing device, at least one of: a project listing notice, a bid closing notice, a losing bid notice, a winning bid notice, a failed bid notice, a bid renewal notice, a bid retraction notice, a notice regarding the requirements of a winning bid, a notice regarding the delivery terms of a winning bid, or a task completion notice.

35. The method of claim 26, further comprising revising, using the processing device, at least one of the project parameters according to at least one of: a listing revision request, a user profile of a bidder, or bidding history.

36. The method of claim 26, wherein resolving the exception comprises one or more of:
replacing a default bidder;
renewing the project listing;
creating a new project listing;
locating a suitable user to take over; or
locating an expert.

37. A computer-implemented method for knowledge management, the method comprising the steps of:
receiving, from a computer of a user delegate, a project listing containing a set of project parameters, the project parameters comprising an identification of at least one expertise area associated with a project;
providing, using the processing device, a bidding room according to at least one of the project parameters;
receiving a bid from a bidder computer using the processing device;
resolving, using the processing device, the bid according to a profile of the bidder and at least one of the project parameters, wherein the project parameters further comprise at least one weight factor associated with the profile of the bidder;
managing feedback information associated with the resolved bid using the processing device, wherein the managing comprises:
computing updated weight factors based on the managed feedback information, the resolved bid, and a learning rate associated with the weight factors; and
resolving an exception to the bid using the processing device, wherein the resolving step comprises computing a penalty associated with the exception and assessing the penalty to a defaulting bidder.

38. The method of claim 37, wherein resolving the bid further comprises computing a quality of the bid according to the profile of the bidder and at least one of the project parameters to identify if a favorable bidder exists.

39. The method of claim 38, wherein computing the quality of the bid comprises using a formula of:

$QoB(i) = W_1 * C_1 +$ $+ W_2 * C_2 + \ldots$ $+ W_n * C_n,$ wherein:
$C_1, C_2, \ldots C_n$ comprise at least one of the project parameters and at least one consideration of the profile of the bidder, and
$W_1, W_2, \ldots W_n$ comprise at least one weight factor associated with the expertise area and at least one weight factor associated with the profile of the bidder.

40. The method of claim 38, wherein computing the quality of the bid comprises using a multi-tuple comprising at least $(M, S, f, s_0)$, wherein:
M is a non-empty set of messages;
S is a non-empty set of states, with $S = S_c * D_s * D_a$;
$S_c$ is a nonempty set of states of the user delegate;
$D_s$ is a nonempty set of self-models of the user delegate;
$D_a$ is a nonempty set of alien-models of the user delegate;
$f: S_c*(M*M)* \rightarrow S_c$ is a state transition function for specifying a next state; and
$s_0$ in S is the initial state of the user delegate.

41. The method of claim 37, further comprising controlling, using the processor, a bidder's access according to at least one of the project parameters and receiving the bid only from a bidder having access.

42. The method of claim 37, wherein receiving the project listing comprises receiving the project listing from a user or a user delegate.

43. The method of claim 37, wherein the project parameters further comprise an identification of an experience level of a user in the expertise area, a weight factor associated with the experience level, at least one qualification parameter setting criteria for qualifying a bidder's access to the project listing, and an option of allowing multi-tasking.

44. The method of claim 37, wherein the project parameters further comprise at least one of: user identification, bidding room identification, project description, a number of hours requested, a duration of a bidding process, an option to set a maximum price if a bidding fails, the maximum price, an option for a direct trade, a direct trade price, or key words.

45. The method of claim 37, further comprising notifying, using the processing device, qualifying bidders according to at least one of the project parameters.

46. The method of claim 41, wherein controlling the bidder's access comprises at least one of: verifying the bidder's registration and controlling the bidder's access to the project listing according to a user profile of the bidder and at least one of the project parameters.

47. The method of claim 37, wherein the bidder is one of a user or a user delegate.

48. The method of claim 37, wherein receiving the bid comprises receiving the bid only from a qualifying bidder.

49. The method of claim 37, further comprising providing, using the processing device, at least one of: a project listing notice, a bid closing notice, a losing bid notice, a winning bid notice, a failed bid notice, a bid renewal notice, a bid retraction notice, a notice regarding the requirements of a winning bid, a notice regarding the delivery terms of a winning bid, or a task completion notice.

50. The method of claim 37, further comprising revising, using the processing device, at least one of the project parameters according to at least one of: a listing revision request, the profile of the bidder, or bidding history.

51. The method of claim 37, further comprising managing feedback information of a user using the processing device.

52. The method of claim 37, wherein resolving the exception comprises one or more of:
replacing a default bidder;
renewing the project listing;
creating a new project listing;
locating a suitable user to take over; or
locating an expert.

53. A computer-implemented method for knowledge management, the method comprising the steps of:

sending, to a bid manager computer, a project listing containing a set of project parameters including an identification of at least one expertise area associated with a project and a weight factor associated with the expertise area, wherein the bid manager computer provides a bidding room according to at least one of the project parameters and controls access by a bidder according to a profile of the bidder and at least one of the project parameters;

receiving, using the processing device, a bid from a bidder having access; and resolving, using the processing device, the bid according to the profile of the bidder having access and at least one of the project parameters, wherein the project parameters include at least one weight factor associated with the profile of the bidder having access; and managing feedback information associated with the resolved bid using the processing device, wherein the managing comprises:
computing updated weight factors based on the managed feedback information, the resolved bid, and a learning rate associated with the weight factors; and
resolving an exception to the bid using the processing device, wherein the resolving step comprises computing a penalty associated with the exception and assessing the penalty to a defaulting bidder.

54. The method of claim 53, wherein resolving the bid further comprises computing a quality of the bid according to the profile of the bidder having access and at least one of the project parameters to identify if a favorable bidder exists.

55. The method of claim 54, wherein computing the quality of the bid comprises using a multi-tuple comprising at least $(M, S, f, s_0)$, wherein:

M is a non-empty set of messages;
S is a non-empty set of states, with $S=S_c*D_s*D_a$;
$S_c$ is a nonempty set of states of the user delegate;
$D_s$ is a nonempty set of self-models of the user delegate;
$D_a$ is a nonempty set of alien-models of the user delegate;
$f: S_c*(M*M)* \to S_c$ is a state transition function for specifying a next state; and
$s_0$ in S is the initial state of the user delegate.

* * * * *